United States Patent [19]
Morrison

[11] Patent Number: 5,727,128
[45] Date of Patent: Mar. 10, 1998

[54] SYSTEM AND METHOD FOR AUTOMATICALLY DETERMINING A SET OF VARIABLES FOR USE IN CREATING A PROCESS MODEL

[75] Inventor: Steven Michael Morrison, Austin, Tex.

[73] Assignee: Fisher-Rosemount Systems, Inc., Austin, Tex.

[21] Appl. No.: 646,919

[22] Filed: May 8, 1996

[51] Int. Cl.$^6$ .................................................... G06F 15/00
[52] U.S. Cl. ............................ 395/10; 395/20; 395/21; 395/23
[58] Field of Search ............................ 358/75; 395/22, 395/26, 76, 68, 11, 21

[56] References Cited

U.S. PATENT DOCUMENTS

| | | | |
|---|---|---|---|
| 3,891,836 | 6/1975 | Lee | 364/132 |
| 5,200,816 | 4/1993 | Rose | 358/80 |
| 5,222,196 | 6/1993 | Bigus | 395/26 |
| 5,265,192 | 11/1993 | McCormack | 395/22 |
| 5,325,298 | 6/1994 | Gallant | 395/759 |
| 5,420,810 | 5/1995 | Yamakawa et al. | 364/724.19 |
| 5,526,407 | 6/1996 | Russell et al. | 379/89 |
| 5,546,503 | 8/1996 | Abe et al. | 395/23 |

FOREIGN PATENT DOCUMENTS

| | | |
|---|---|---|
| 4-175964 | 6/1992 | Japan. |
| WO 94 25933 | 11/1994 | WIPO. |

OTHER PUBLICATIONS

PCT International Search Report for International Application No. PCT/US 97/07802, mailed Aug. 28, 1997.

Bill Machrone, "Care and Feeding of Neural Nets," *P.C. Week*, p. 63 (Jun. 5, 1995).

Alex Lane, "Engineering Neural Networks with Genetic Algorithms," *AI Expert*, p. 11 (May 1995).

Qin, "Partial Least Squares Regression for Recursive System Identification," IEEE Decision and Control, 1993, 32nd Annual Conf. pp. 2617–2622, Dec. 30, 1993.

Qin, "A Statistical Perspective of Neural Networks for Process Modeling and Control," IEEE Intelligent Control, 1993 Int'l. Symposium, pp. 599–604, Dec. 30, 1993.

Fisz, "Probability Theory and Mathematical Statistics," John Wiley and Sons, pp. 79–91, Dec. 30, 1963.

Dong et al., "Batch Tracking Via Nonlinear Principal Component Analysis," pp. 1–34, presented at NN Club Meeting (Sep. 28, 1995).

Dong et al., "Batch to Batch Optimization Using Neural Network Models," pp. 1–32, presented at NN Club Meeting (Sep. 28, 1995).

Geladi, "Notes on the History and Nature of Partial Least Squares (PLS) Modelling," 2 *J. Chemometrics*, pp. 231–246 (1988).

(List continued on next page.)

Primary Examiner—David K. Moore
Assistant Examiner—Ji-Yong D. Chung
Attorney, Agent, or Firm—Marshall, O'Toole, Gerstein, Murray & Borun

[57] ABSTRACT

A process modeling system and method develop a set of process model inputs for a process model, such as a neural network, from values for a number of process input variables and at least one process output variable. The system and method first determine a correlation measurement between each of the process input variables and the process output variable and select a set of potential model input variables based on the correlation measurements. The system and method then iteratively determine a succession of sets of potential model input variables by performing a regression analysis on the selected set of potential model input variables and the model output variable and by then refining the set of potential model input variables based on the result of the regression analysis and on the correlation measurements. After a number of iterations, the system and method choose a set of potential model input variables as the set of model inputs and develop a process model from the chosen set of model inputs.

27 Claims, 6 Drawing Sheets

OTHER PUBLICATIONS

Geladi et al., "Partial Least-Squares Regression: A Tutorial," 185 *Analytica Chimica Acta* 1 (1986).

Hayes et al. "Experience Using a Neural Network to Model Polymer Molecular Weight," pp. 1–5, presented at ISA Trade Show (Oct. 4, 1995).

Helland, "On the Structure of Partial Least Squares Regression," 17(2) *Commun. Statist.–Simula.*, pp. 581–607 (1988).

Kasper et al., "Dynamic PLS Modelling for Process Control," 48 *Chemical Engineering Science*, pp. 3447–3461 (1993).

Kresta et al., "Multivariate Statistical Monitoring of Process Operating Performance," 69 *Canadian J. Chem. Engineering*, pp. 35–47 (Feb. 1991).

Kresta et al., "Developmental of Inferential Process Models Using PLS," 18 *Computers Chem. Engng.*, pp. 597–611 (1994).

Kosanovich et al., "Multi-Way PCA Applied to an Industrial Batch Process," *Proceedings of Am. Control Conference*, pp. 1294–1298 (Jun. 1994).

MacGregor et al., "Monitoring Batch Processes," *NATO Advanced Study Institute (ASI) for Batch Processing Systems Eng.*, pp. 1–20 (May 1992).

MacGregor et al., "Multivariate Statistical Process Control of Batch Processes Using PCA and PLS," pp. 525–529 (1995).

MacGregor et al., "Process Monitoring and Diagnosis by Multiblock PLS Methods," 40 *AIChE J.*, pp. 826–838 (May 1994).

MacGregor, "Statistical Process Control of Multivariate Processes," presented at *Advanced Control of Chemical Processes*, IFAC ADCHEM, 11 pages (May 1994).

MacGregor et al., "Statistical Process Control of Multivariate Processes," 3 *Control Eng. Practice*, pp. 403–414 (1995).

Manne, "Analysis of Two Partial-Least Squares Algorithms for Multivariate Calibration," 2 *Chemometrics and Intelligent Laboratory Systems*, pp. 187–197 (1987).

Morrison et al., "Neural Networks for Process Prediction," 8 pp., presented at ISA Trade Show (Oct. 3, 1995).

Nomikos et al., "Multivariate SPC Charts for Monitoring Batch Processes," 37 *Technometrics*, pp. 41–59 (Feb. 1995).

Qin et al., "A Data-Based Process Modeling Approach and Its Applications," *Pre-prints of the Third IFAC Dycord+ Symposium*, pp. 321–326 (1992).

Qin et al., "Combining Statitics and Expert Systems With Neural Networks For Empirical Process Modeling," presented at *ISA International Conf.*, pp. 1711–1720 (Sep. 1993).

Qin, "Integration and Comparison of Neural Networks and Conventional Modeling Techniques," *Dissertation for Ph.D. at the University of Maryland*, (1992).

Qin et al., "Nonlinear PLS Modeling Using Neural Networks," 16 *Computers Chem. Engng.*, pp. 379–391 (1992).

Wise, "Tutorial: Using the PLS Toolbox in PAC Applications" 5 *Process Control and Quality*, pp. 73–85 (1993).

Wold et al., "Multi-Way Principal Components and PLS-Analysis," 1 *J. Chemometrics*, pp. 41–56 (1987).

Wold et al., "Principal Component Analysis," 2 *Chemometrics and Intelligent Laboratory Systems*, pp. 37–52 (1987).

User Manual, Intelligent Sensor Tool Kit (Version 1.1), Fisher Rosemount Systems, Inc., pp. 6–1 to 6–21 (1995).

5,727,128

SYSTEM AND METHOD FOR AUTOMATICALLY DETERMINING A SET OF VARIABLES FOR USE IN CREATING A PROCESS MODEL

TECHNICAL FIELD

The present invention relates generally to systems which construct models of a process based on process data measured during previous runs of that process and more particularly to a system and method of automatically determining an appropriate set of input variables for use in a process model.

BACKGROUND ART

Generally, processes can be classified into continuous, semi-continuous and batch processes. A continuous process is one which operates on raw materials or feed elements at a continuous rate to produce a continuous stream of product at an output. Examples of continuous processes include petroleum refining processes, vitamin C production processes and certain commodity chemical manufacturing processes. The values of process variables, such as temperature, pressure, flow rate, etc., typically remain the same over time at any location within a continuous process.

A batch process is a process which operates on a limited quantity of raw materials or feed elements as a group and which forces those feed elements through a series of process steps to produce a "batch" of an output product. Usually, no new feed elements are introduced during operation of a batch process. Examples of batch processes include the manufacture of beer, the manufacture of some pharmaceutical drugs and the production of many specialty chemicals. The values of process variables typically change over time at one or more locations within a batch process.

A semi-continuous process is a continuous process which has one or more batch components therein. A semi-continuous process may operate on a continuous supply of raw materials to produce a continuous stream of output product but has, for example, a set of mixers which mix a limited quantity of the materials being processed for a limited time somewhere within the process.

There are many situations in which it is beneficial to estimate a future state of a continuous, semi-continuous or batch process based on past or current values of process variables, for example, the temperature and the pressure of a fluid within the process. In some situations it is also desirable to estimate the current value of one or more unmeasurable process variables based on the past or current measured values of other process variables. This process state or variable estimation enables the fast correction of continuous and semi-continuous processes because a user can correct control parameters associated with those processes before the quality of the product actually produced by those process begins to deteriorate. Process state or variable estimation also enables a user to determine if the final output of a particular batch process will be acceptable during a run of the process or, on the other hand, if that batch process should be stopped because the product being produced will likely be below acceptable standards.

In the past, multi-layer feed-forward networks, such as neural networks, have been used to construct empirical or semi-empirical models of continuous, semi-continuous and batch processes and have been used to perform process variable estimation and prediction. However, the process of creating a neural network that accurately models a process is complex, time consuming and, typically, must be performed by a process expert. To provide the reader with a better understanding of the complexity involved in creating neural networks, a brief description of a neural network along with the steps necessary to create, train and test such a neural network is provided below.

Referring to FIG. 1, a neural network can be represented as a number of interconnected layers of "neurons" having inputs and outputs thereto. In particular, neural networks include an input layer which comprises the inputs to the neural network, an output layer which produces the outputs of the neural network and any number of "hidden" layers.

Neural network inputs typically include measured or ascertainable process variables (or input variables) while neural network outputs typically represent the predicted output of the process being modeled. A neural network output (referred to herein as an output variable) may be, for example, the predicted value of an attribute, such as consistency, hardness, pH, smell, etc., of the product being produced, or may be the predicted value of any other process variable.

The input layer of a neural network receives information in the form of process input variable values and usually has one neuron for each provided input variable. Typically, the neurons in this layer perform no function other than buffering the input variable values. Each hidden layer of a neural network processes information from the input layer or other hidden layer and sends the results to the next layer which may be another hidden layer or the output layer. Hidden layers, which are internal to the neural network and have no direct contact with or counterpart in the process being modeled, usually have sigmoidal transfer functions necessary to capture non-linear information. The output layer produces calculated values and, typically, consists of linear neurons.

As illustrated in FIG. 1, neural networks may also include bias neurons which are connected to each neuron except those neurons in the input layer. Bias neurons behave similarly to other neurons in the same layer, except that bias neurons do not receive inputs from other neurons. Instead, bias neurons are constant-source inputs which produce a value of one.

During operation, each neuron of a neural network sums the signals provided at its input, multiplies that summation signal by a set of weights, which are selected or determined during training of the neural network, and provides a weighted summation signal to each of the neurons in the next layer. These addition and multiplication steps are performed simultaneously for the neurons in each layer, beginning with the input layer and proceeding in a feed-forward manner though the hidden layers to the output layer, to produce the output values of the neural network. For a well-trained neural network, the output values comprise predicted values of the output variables of a process based on the provided input variable values.

Although the neural network of FIG. 1 includes one hidden layer having five neurons, neural networks may have any number of hidden layers, each having any desired number of neurons. Typically, neural networks that include a large number of hidden layers and/or a large number of neurons per layer comprise a better model of a process. However, such large neural networks are also more difficult to construct, require more processing time to build and to implement and can actually be less accurate than more simple neural networks when used to make general predictions about a process.

To construct a neural network for a process, process data pertaining to a number of process input variables and output variables is first measured or collected. Next, the collected data is preprocessed to eliminate or account for missing values, noise in the data and other data characteristics which may cause the neural network to be constructed from incomplete or erroneous data. This pre-processing procedure is necessary because measured process data often contains missing values, noise and unexpected upsets caused by different sources within the process.

A set of input and output variable is then chosen to be used by the neural network. Typically, a time delay associated with each of the input variables is also selected or determined. The choice of a time delay for each input variable allows the set of input variables to include process variables measured at different times during the process. For example, a user may decide to use temperature at five minutes before the output and pressure at six minutes before the output as two of the inputs to a neural network. The step of choosing input variables and time delays associated therewith is critical to the creation of an accurate process model because the inclusion of irrelevant process variables as inputs to a neural network can degrade the prediction accuracy of that neural network.

When all of the input and output variables and the time delays associated therewith have been chosen, a training file including data pertaining to the selected input and output variables at the selected time delays is created from collected data. In particular, training variable values for each of the selected input variables at the selected time delays are gathered from data associated with a number of different runs of a process or a number of different times within the process. Thereafter, the neural network is trained using the data within the training file as input and output variable values.

Training a neural network includes the steps of determining the number of hidden layers and the number of neurons per layer and then adjusting the weights associated with each neuron so as to create a model which produces the statistically best approximation of the output values within the training file from the input values within the training file. A neural network training program may adjust the network weights in proportion to a calculated error between the calculated outputs and a set of actual or target outputs within the training file to reduce the difference between the calculated and target output values. Such weight correction is typically accomplished using a back propagation learning algorithm or a conjugate gradient method which improves the learning speed and robustness of the neural network.

The particular steps necessary for training a neural network are well known and are not necessary for an understanding of the present invention. Therefore, neural network training methods will not be described in detail herein. However, for a more complete discussion of neural network training methods, reference may be made to the following books: Dayhoff, "Neural Network Architecture; An Introduction," (1990) and Simpson, "Artificial Neural Systems: Foundations, Paradigms, Applications and Implementations," (1990).

After a neural network is trained for a particular process, the correct operation or prediction ability of that neural network is verified on a new set of test data to determine how well the neural network actually predicts measured process output variables from the selected process input variables.

As noted above, in designing a neural network for a process model, it is important to choose the appropriate input variables and time delays. However, the choice of such variables and time delays is complicated because there is usually a large number of process variables associated with a process. Users who are not intimately familiar with a process may, therefore, have difficulty in selecting the appropriate variables for use as inputs and outputs to a neural network, even for simple processes. Selecting an appropriate set of input and output variables is even more complicated in batch processes where the values of potential process variables typically change over time.

In the past, partial least squares (PLS) analysis has been used as an aid to determine an appropriate set of input variables for a neural network. See, for example, Qin and McAvoy, "A Data-Based Process Modeling Approach and It's Applications," Pre-Prints of The Third IFAC DYCORD+ Symposium, pp. 321–326 (1992). PLS and other regression analyses have also been used to develop process models for batch processes. See, for example, MacGregor et al., "Process Monitoring and Diagnosis by Multiblock PLS Methods," 40 AIChE J. 826 (May 1994) and Kosanovich et al., "Multi-Way PCA Applied to an Industrial Batch Process," Proceedings of Am. Control Conf., pp. 1294–1298 (June 1994).

Essentially, PLS analysis is a linear mathematical tool which applies a line-fit to a set of input and output data, determines the residual error between the line fit and the actual data, sets this residual error as the output and repeats the line-fit process on the residual error to determine a better line-fit. The PLS analysis repeats these steps until the residual error falls below a predetermined threshold.

PLS analysis may be used to determine an overall correlation measurement between a chosen set of input variables and a set of output variables and also to determine a sensitivity measurement indicating how critical each of the input/output variable pairs is to the overall correlation measurement. An input/output variable pair having a high PLS sensitivity value (near 1.0) generally indicates that the input variable is very relevant to the determination of the overall correlation measurement and is, therefore, more predictive of the output variable. An input/output variable pair having a low PLS sensitivity value (near 0.0) generally indicates that the input variable is not very relevant to the determination of the overall correlation measurement and is, therefore, less predictive of the output variable(s).

A user may run a PLS analysis on a selected set of input and output variables and then refine the set of input and output variables by adding variables to and/or deleting variables therefrom based on the sensitivity measurements developed by a PLS analysis. The user may then further refine the set of variables by running further PLS analyses on selected sets of variables and choosing new set of variables based on the results of the PLS analyses. However, this refining process can be complex, tedious, and time consuming because it requires the user to alternatively run a PLS analysis and provide manual input in the form of choosing new input and output variables. Also, this process may not provide an optimal set of input and output variables because the user simply might not choose the best set of variables.

Still further, a PLS analysis does not initially indicate which of the numerous potential process variables are good candidates as input and output variables in a process model. Thus, the choice of the particular input and output variables for processing with the PLS analysis is dependent, to a great extent, on the knowledge and expertise of the user. As a result, a user who is knowledgeable about a process will typically be able to choose a more appropriate set of variables than a user who is less knowledgeable about the process. It is desirable, however, to provide a method of selecting a set of input and output variables for use in a process model which is not greatly dependent on the expertise of the user and which is not so tedious and time consuming.

SUMMARY OF THE INVENTION

The present invention relates to a system and method of automatically determining an appropriate set of input and/or output variables for use creating a process model, such as an empirical or semi-empirical model. According to one aspect of the present invention, a system and method automatically determine an appropriate set of variables for use in developing a feed-forward predictive network, such as a neural network, for the process. Preferably, this automatic method uses combinations of known mathematical correlation analyses to develop a set of model input and/or output variables for use by the process model.

According to another aspect of the present invention, a process modeling system and method automatically develop a set of process model inputs for a process model from values for a number of process input variables and at least one process output variable. The system and method first determine a correlation measurement, which may include linear and/or non-linear correlation coefficients, between each of the process input variables and the at least one process output variable. Next, a set of potential model input variables is selected based on the correlation measurements. Thereafter, a regression analysis, such as a PLS analysis, is performed on the set of potential model input variables to produce a regression analysis result. The system and method then choose the set of potential model input variables as the set of model inputs based on the regression analysis result if, for example, the regression analysis result is above a predetermined threshold. The system and method may then develop a process model, such as a neural network, from the chosen set of model inputs.

The process modeling system and method may select the set of potential model input variables as a predetermined number of the process input variables having the highest correlation measurements associated therewith or as all of the process input variables having an associated correlation measurement greater than a predetermined threshold.

The system and method may also refine the set of potential model input variables by picking a new set of potential model input variables and running a regression analysis on the new set of potential model input variables. Preferably, the process modeling system and method calculate a sensitivity measurement relating each of the set of potential model input variables to the at least one process output variable and select the new set of potential model input variables based on the sensitivity measurements and/or based on the correlation measurements. The system and method may, however, display the regression analysis result and/or the set of correlation measurements to a user and allow the user to select the set of potential model input variables and/or a new set of potential model input variables based on the correlation measurements and/or the regression analysis results.

According to another aspect of the present invention, a process modeling system automatically develops a set of model inputs from values for a multiplicity of process input variables and at least one process output variable. The system first determines a correlation measurement between each of the process input variables and the at least one process output variable. The system then selects a set of potential model input variables from the multiplicity of process input variables. Thereafter, the system implements a regression analysis on the set of potential model input variables and iteratively refines the set of potential model input variables by creating a new set of potential model input variables based on the correlation measurements and by then running the regression analysis on the new set of potential model input variables. The system then chooses one of the sets of potential model input variables as the set of model inputs based on a selection criterion.

DETAILED DESCRIPTION

Figure 1:
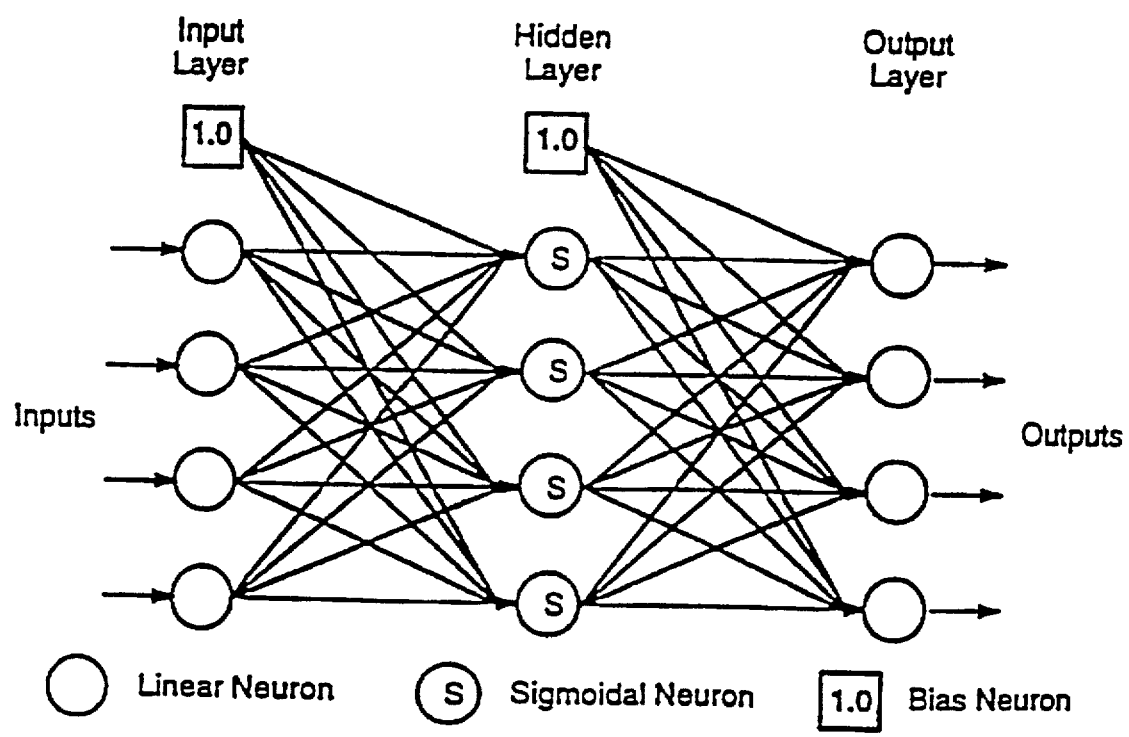
FIG. 1 is schematic diagram of a classic neural network.
Figure 2:
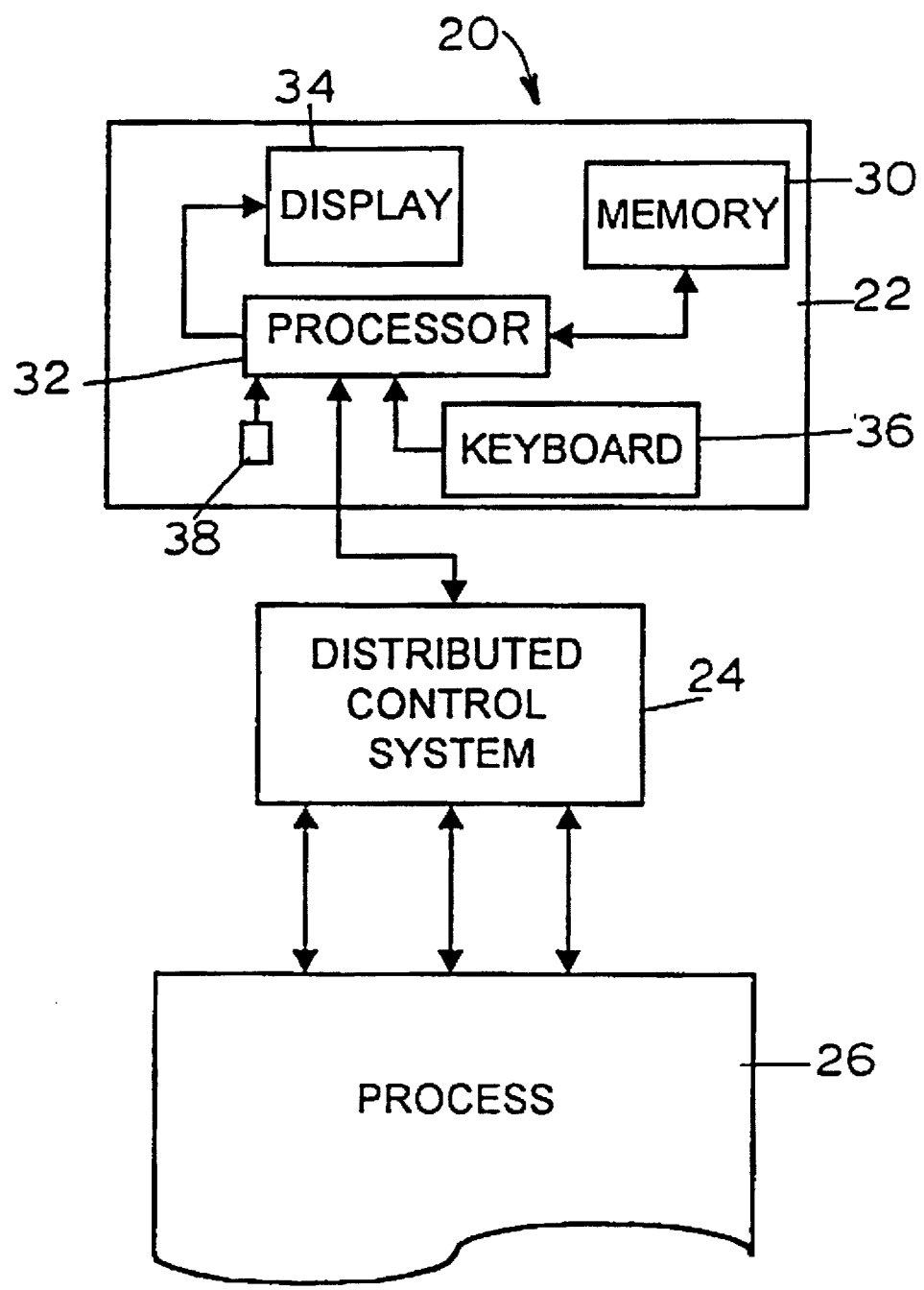
FIG. 2 is a block diagram of a process control system which develops a process model according to the present invention.

Referring now to FIG. 2, a process control system 20 capable of creating and using a process model includes a user workstation 22 which is connected to and communicates with a distributed control system (DCS) 24. The DCS 24 is connected to and communicates with sensors and other field devices (not shown) within a process 26. The process 26 may be any type of continuous, semi-continuous or batch process having process variables, such as temperature, pressure, etc.

The DCS 24 may comprise any desired or known type of controller capable of controlling the process 26 and of obtaining data pertaining to the values of process variables associated with the process 26. The DCS 24 may provide such process variable values to a library or memory 30 within the workstation 22 or may provide such values to any other memory or database accessible by the workstation 22.

Preferably, the workstation 22 is a PC-based workstation that includes a microprocessor 32 connected to the memory 30 and to user input and output devices including a display screen 34, a keyboard 36 and a mouse 38. The workstation 22 may also include any other desired peripherals such as printers, modems, etc. The memory 30 may be a part of the workstation 22 and connected to the DCS 24 through the microprocessor 32 or may be located outside of the workstation 22 and connected to the DCS 24 and the microprocessor 32.

During or after operation of the process 26, a user instructs the microprocessor 32 to run a program or a routine that creates a process model for the process 26. This program, which may be, for example, the memory 30, may construct any desired type of empirical or semi-empirical model but, preferably, constructs, trains and tests a feed-forward predictive network, such a neural network, to model the process 26. The constructed process model may be used in any known manner to, for example, predict future values of process variables or process outputs of the process 26, to estimate current, unmeasurable process variables of the process 26, to determine if the control of the process 26 needs to be altered to correct the operation of that process, or to perform any other desired function with respect to the process 26.

The program or routine implemented by the microprocessor 32 constructs the process model for the process 26 from process variable data which has been collected by the DCS 24 and stored in the memory 30 or in any other memory coupled to the microprocessor 32. Instead of or in addition thereto, the program may use process variable data collected by a user and downloaded to the workstation 22 electronically or manually or may use any data pertaining to the process 26 obtained in any other manner. The program may also compute process data associated with process variables which are statistical in nature, such as means, medians, standard deviations and/or any other statistical measurements of process variables, from the data collected by a user or the DCS 24. These statistical process variables may be associated with any length of time and/or cover any time period of operation of the process 26. The computed or determined values of these statistical process variables may also be stored in the memory 30.

Figure 3:
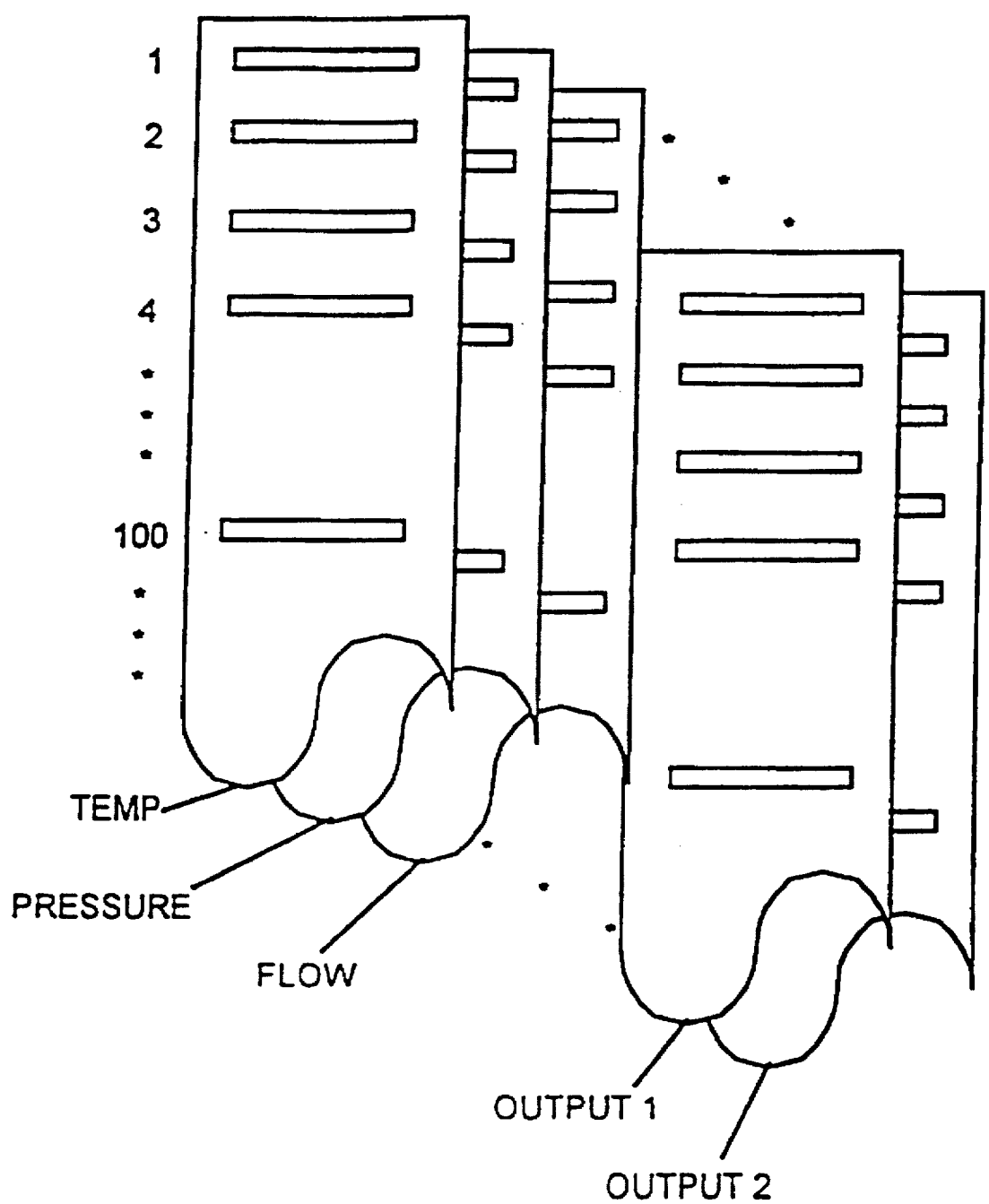
FIG. 3 is a diagram illustrating a continuous file used by the system of FIG. 2.

FIG. 3 illustrates a data file which is developed by the DCS 24 and/or workstation 22 and which is stored in the memory 30 for a continuous process, referred to hereinafter as a continuous file. As illustrated in FIG. 3, a continuous file may include a measurement or data value (indicated in FIG. 3 by a rectangular box) for each of a set of measurable or statistical process variables associated with a process, such as temperature, pressure, flow, etc., at a number of times. A continuous file may also include a measurement or data value for each of a set of output variables associated with a continuous process at the same or a different number of times.

The exemplary continuous file illustrated in FIG. 3 includes sub-files having data for the temperature, pressure and flow process variables measured or determined at, for example, one hundred times during the continuous process and sub-files having data for two output variables (indicated in FIG. 3 as output 1 and output 2) measured or determined at, for example, one hundred times during the process. However, any other number of values for any number of input and output variables may be measured and included within the continuous file of FIG. 3. Furthermore, the measurements or determinations for each of the sub-files of FIG. 3 may be made at the same or different times and each sub-file may include the same or a different number of values as any other sub-file.

The one hundred values illustrated in FIG. 3 may, for example, correspond to one measurement every minute for the first one hundred minutes of a continuous process. However, because a continuous process is ongoing, further data can be added to the bottom of each of the sub-files of the continuous file of FIG. 3 as that data is measured or obtained by, for example, the DCS 24.

Figure 4:
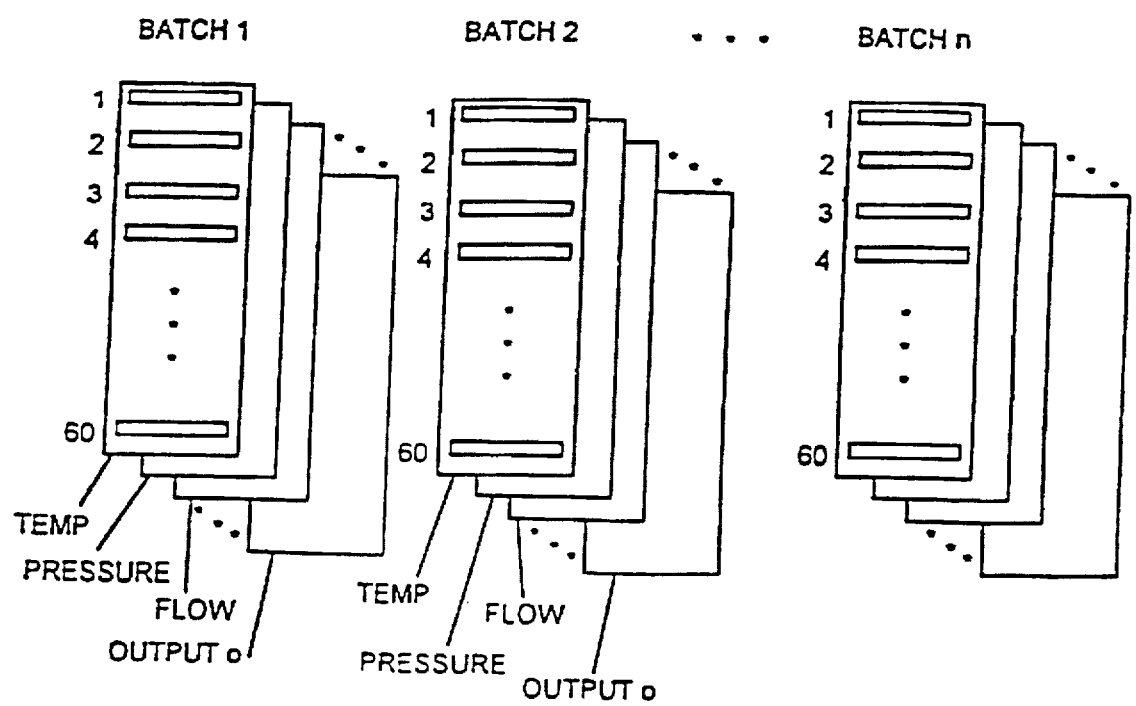
FIG. 4 is a diagram illustrating a set of batch files used by the system of FIG. 2.

FIG. 4 illustrates a set of data files developed by, for example, the DCS 24 for n (where n can be any number greater than zero) runs of a batch process. Each of these data files is referred to hereinafter as a batch file. As illustrated in FIG. 4, each batch file may include a set of process variable measurements or data values for each of a set of measured or statistical process variables of a batch process. The batch files of FIG. 4 may also include a set of output variable measurements or data values associated with one or more output variables of the batch process. The exemplary batch files illustrated in FIG. 4 include data associated with m process input variables and o process output variables.

Unlike continuous files, which may have a different output measurement value associated with an output variable at each time of the process, each of the batch files of FIG. 4 typically has only one output value associated with each output variable because there is only one output of each batch process (instead of a continuous output). Furthermore, because batch processes have definite beginning and ending points, batch files do not have any further data added thereto after the end of a batch run. Instead, a new batch file is created for each run of the batch process.

Although each of the n batch files of FIG. 4 is indicated as having sixty measurements therein, which may correspond to, for example, one measurement per minute in an hour long batch process or any other periodic or non-periodic measurements, the separate sub-files (marked as temperature, pressure, etc.) of each of the batch files and of the different batch files can have any desired numbers of measurements or values associated therewith. Thus, for example, the pressure sub-file of the first batch file of FIG. 4 may include the same or a different number of measurements or values as the temperature sub-files and/or flow sub-files associated with the first batch file and may include the same or a different number of measurements or values as any of the sub-files of any of the second, third, etc. batch files of FIG. 4. Also, the measurements of any two sub-files of the same or any two different batch files may be made at the same time or at different times with respect to the beginning or the end of a batch run. Similar to the continuous file of FIG. 3, the batch files of FIG. 4 may include any number of sub-files associated with any number of process input variables and process output variables.

Generally, each of the batch files of FIG. 4 will comprise trajectory files, one-shot files or actual files. Trajectory files are files which include input data values or measurements made periodically or non-periodically over a part of a batch run or over the entire batch run. One-shot files include values or measurements pertaining to a single time within a process such as, for example, a value measured for or determined by a lab analysis. One-shot files may include measurements of parameters at the beginning or at the end of a batch run or other measurements which are taken at non-periodic times. For example, one-shot files might include a list of the specific feed materials delivered to the input of the process, measurements made at the midpoint of a batch run, etc. Actual files include values that indicate the actual output of a batch run and may include values of any desired or known output variables which indicate the success or failure of a run of a batch process.

The program or routine implemented by the processor 32 (FIG. 2) to create a process model for the process 26, uses the data within the continuous file of FIG. 3, if the process 26 is a continuous process, or uses the data within the batch files of FIG. 4, if the process 26 is a batch process, to automatically determine an appropriate set of input and output process model variables for use in developing a process model.

Figure 5:
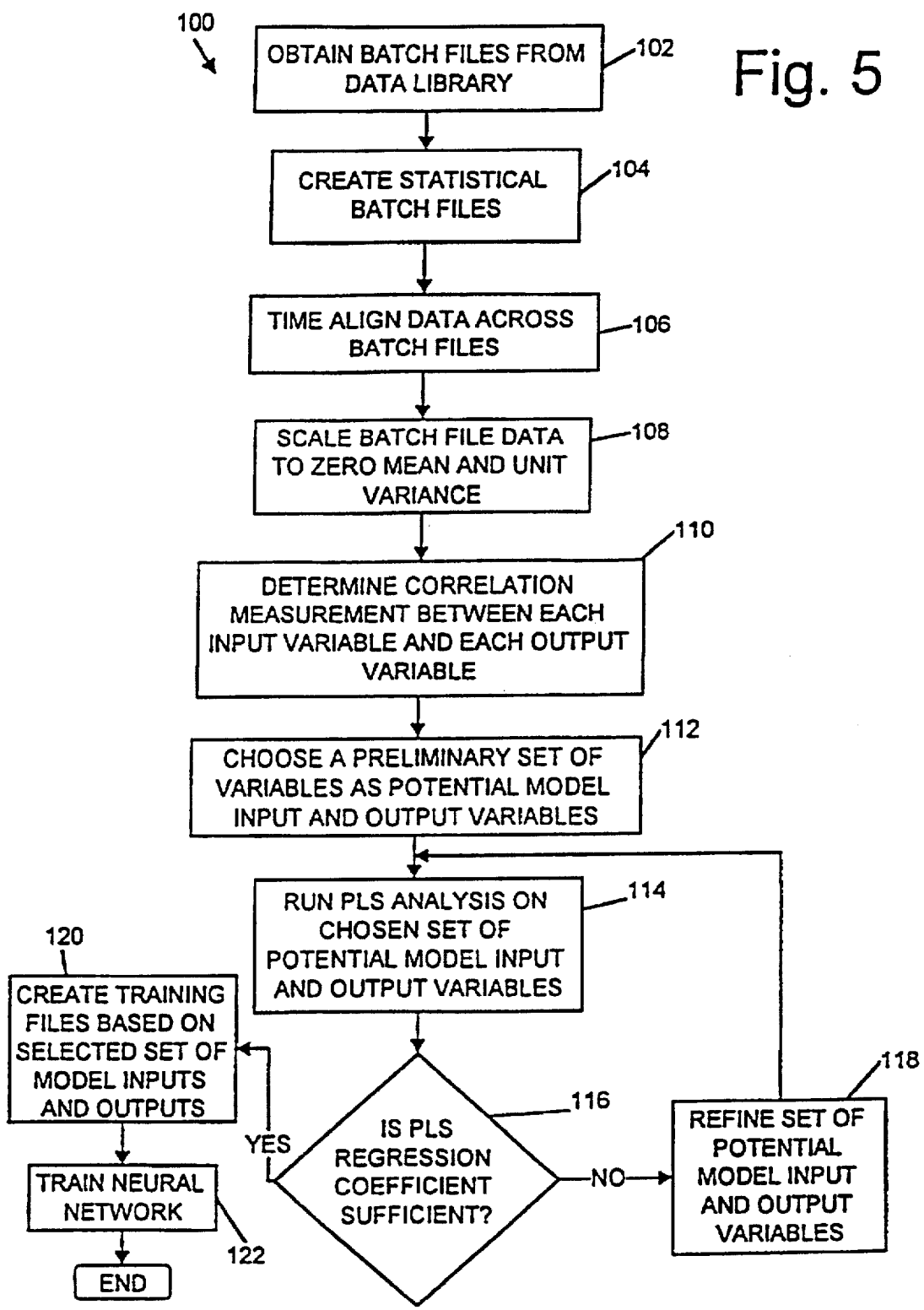
FIG. 5 is a flow chart illustrating the steps implemented by the system of FIG. 2 to automatically determine an appropriate set of input and/or output variables for use in creating a process model according to the present invention.

Referring to FIG. 5, an exemplary routine 100 which automatically determines an appropriate set of variables for use as inputs and outputs in a process model for a batch process is illustrated. The routine 100 includes a block 102 which obtains batch files, such as those illustrated in FIG. 4, from a data library or memory and/or from a user. The batch files may be, for example, trajectory files, one-shot files and/or actual files. If desired, the block 102 may preprocess the data within the batch files by eliminating outliers, filling in or eliminating missing data and/or performing any other desired types of data preprocessing.

A block 104 creates batch files for any desired statistical variables from data within the supplied batch files. These statistical batch files may include statistical data for any desired type of statistical variables such as means, mediums, minimums, maximums, standard deviations, etc. over any desired time period within a run of a batch process. The block 104 can automatically calculate a predetermined set of such statistical files and/or may allow a user to specify a set of statistical variables for which batch files are to be created.

Because the data measured or calculated for any particular variable, such as temperature, may be measured at slightly different times in different runs of the batch process, the data within the sub-files of each of n batch files must be time aligned with the data within the similar sub-files of the other batch files so that all of the sub-files for a particular variable have data values which relate to the same relative time or time period within a batch run. A block 106 performs this function by time aligning or time scaling the data across the similar sub-files of batch files for a batch process by, for example, interpolating between successive values within the batch sub-files to determine the data value at each of a number of desired periodic or non-periodic times.

Figure 6:
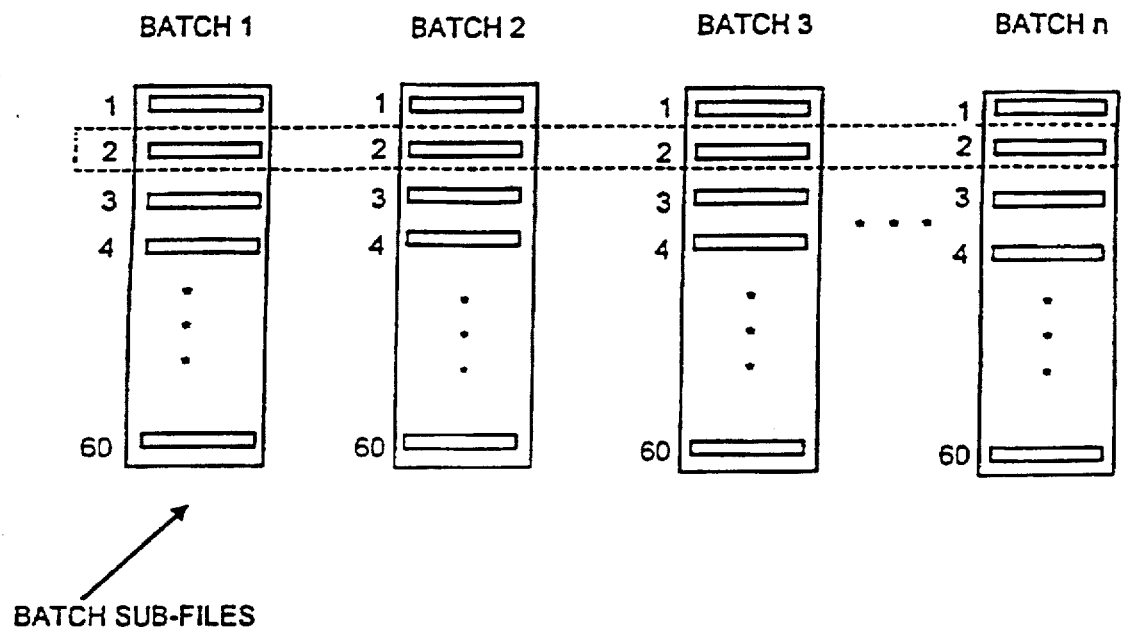
FIG. 6 is a diagram illustrating a set of time aligned batch sub-files in accordance with the present invention.

The process of time aligning data will be described in more detail with respect to FIG. 6, which illustrates exemplary batch sub-files associated with, for example, a particular temperature measurement for n batch runs of a batch process. Each temperature sub-file of FIG. 6 is illustrated in an exemplary manner as including sixty time-aligned data values. To develop the sixty time-aligned values, the block 106 might have to, for example, determine how long each batch run actually lasted, divide that run time by sixty and interpolate between measured temperature data values within each of the n batch sub-files to develop an estimate of the temperature at the sixty times for each of the n batch sub-files. In batch runs which have the same run time but in which measurements are not made at exactly the same times, the block 106 might simply have to interpolate between data values to determine temperature measurements at the desired periodic or non-periodic times. Of course this description is merely exemplary, there being many other ways in which the block 106 can time align data within the batch sub-files, depending on the particular types of batch processes and variables involved, the types and frequency of the process variable measurements, etc. Suffice it to say that it is important that the block 106 time align the data across batch sub-files for each input and output variable such that each of the n batch sub-files associated with an input or an output variable has values for that variable relating to the same relative or approximate time or time period within each batch run.

Referring again to FIG. 5, a block 108 may scale the data across the batch sub-files associated with each of the input and output variables so that this data has zero mean and unit variance. The zero mean and unit variance of any particular data position or time slot within a batch sub-file is calculated with respect to the data within each similarly numbered data position of all of the batch sub-files associated with a particular variable. Thus, the zero mean and unit variance is calculated with respect to data within the same time slots of FIG. 6 and would, for example, be calculated for the data set within the row of data surrounded by the dotted box in FIG. 6.

If the batch sub-files of any particular variable are represented in matrix form, wherein the column number (i) of the matrix identifies the batch run of the data associated with that variable and the row number (j) of the matrix identifies the time slot within the batch sub-files with which the data is associated, the mean for any row j can be calculated using the equation:

$$Amean_j = \frac{\sum_{i=1}^{n} A_{i,j}}{n} \quad (1)$$

wherein:
$A_{i,j}$ = the value of the variable A at the jth time slot of the ith batch file;
$n$ = the number of batch files; and
$Amean_j$ = the mean of the variable A at the jth time slot across the n batch files.

The variance for a time slot j can be calculated using the equation:

$$Avar_j = \frac{\sum_{i=1}^{n} (A_{i,j} - Amean_j)^2}{n} \quad (2)$$

wherein:
$Avar_j$=the variance for the variable A at the jth time slot. The batch sub-file data can then be scaled to zero mean and unit variance according to the equation:

$$AS_{i,j} = \frac{A_{i,j} - Amean_j}{Avar_j} \quad (3)$$

wherein:
$A_{si,j}$=the zero mean, unit variance scaled value of the variable A at the jth time slot of the ith batch file.

Next, a block 110 determines a correlation measurement between one or more of the input variables (at selected time slots) and one or more of the output variables. This correlation measurement can be calculated in any desired manner and may be displayed to a user via the display 34 (FIG. 2). Preferably, the block 110 determines a linear correlation measurement between each of the input variables at each of the time slots within the batch files and the output variables. This linear correlation coefficient may be calculated as:

$$CC_{A_j,O_k} = \sum_{i=1}^{n} A_{i,j}O_{i,k} - \frac{\sum_{i=1}^{n} A_{i,j} \sum_{i=1}^{n} O_{i,k}}{n} \quad (4)$$

wherein:
$CC_{A_j,O_k}$=the correlation coefficient between the input variable A at the jth time slot and the output variable O at the kth time slot. (Note, in batch processes there may only be one output value for each batch run);
$A_{i,j}$=the value of the input variable A at the jth time slot of the ith batch file;
$O_{i,k}$=the value of the output variable O at the kth time slot of the ith batch file;
$Avar_j$=the variance of the input variable A at the jth time slot;
$Ovar_k$=the variance of the output variable O at the kth time slot; and
n=the number of batch files (in batch processes) or the number of records for which the coefficient is being determined (in continuous processes).

If the data values for the input variable A and the output variable O have been scaled to zero mean and unit variance according to, for example, equation (3), equation (4) can be simplified to:

$$CC_{A_j,O_k} = \sum_{i=1}^{n} AS_{i,j} OS_{i,k} \quad (5)$$

However, correlation measurements between the input and output variables can be calculated using any other desired linear function or any desired non-linear function including, for example, a non-linear correlation function which determines correlation coefficients between two or more input variables and an output variable. As an illustration, correlation coefficients between an output variable $O_m$ and two input variables $A_j$ and $B_k$ may be determined by calculating a predicted value $Opred_m$ of the output variable as a function of the input variables $A_j$ and $B_k$ and, in particular, as:

$$Opred_m = C_1 A_j^{c2} B_k^{c3} + C_4 \quad (6)$$

wherein:

$Opred_m$=the predicted value of the output variable O at the mth time slot;

$A_j$=the value of the input variable A at the jth time slot;

$B_k$=the value of the input variable B at the kth time slot; and $C_1$ to $C_4$=constants.

If the input variables $A_j$ and $B_k$ and the output variable $O_m$ are scaled to zero mean and unit variance, then equation (6) becomes:

$$Opred_m = C_1 A_j^{c2} B_k^{c3} \quad (7)$$

The constants $C_1$ to $C_4$ of equations (6) or (7) can be solved to minimize the squared error between the actual values of the variable $O_m$ and the values of $Opred_m$, i.e., according to the equation:

$$MIN \left| \sum_{p=1}^{n} (O_{m_p} - Opred_{m_p})^2 \right| \quad (8)$$

wherein:

$O_{m_p}$=the value of $O_m$ for the pth batch run; and $Opred_{m_p}$=the predicted value of $O_m$ for the pth batch run. Thereafter, the constants $C_1$, $C_2$, and $C_3$ can be used as the correlation measurements between the pair of input variables $A_j$ and $B_k$ and the output variable $O_m$. These calculations could be repeated for each pair of input variables and each output variable to produce a set of non-linear correlation coefficients. Likewise, similar calculations could be performed for combinations of three, four, etc. input variables and one or more output variables to develop further sets of correlation coefficients.

Although two methods of determining correlation measurements have been given herein, it is contemplated that any other correlation measurements can be developed in any desired manner including, for example, correlation measurements developed using regression analysis, and still fall within the scope of the present invention, as long as these correlation measurements relate one or more input variables to one or more output variables.

After the block 110 determines correlation measurements between the input variables and the output variables, a block 112 chooses a preliminary set of input variables and output variables as a set of potential model input and output variables based on the correlation measurements. The block 112 may, for example, choose the input variables having the highest five, ten, or any other number of correlation measurement values. Alternatively or in addition, the block 112 may choose any input variable and output variable pair having a correlation measurement value above a predetermined level, for example, 0.5. Of course, the block 112 may allow a user to specify which variables to choose as the set of potential model input and output variables based on the displayed correlation measurements and/or the block 112 may choose potential model input and output variables based on the correlation measurements in any other desired manner. Typically, a user will specify the set of model output variables so that the block 112 chooses only a set of potential model input variables.

After the block 112 has chosen a set of potential model input and/or output variables, a block 114 runs a PLS analysis to determine how well the chosen set of potential model input variables, when taken together, correlate with or act as a predictor of the chosen set of potential model output variables. Alternatively, the block 114 may implement any other desired type of regression analysis such as a principal components analysis, ridge regression, etc.

To implement a PLS or other regression analysis, the block 114 first develops a set of training and/or test records from the data values for the selected potential model input and output variables, wherein each training and/or test record has one value for each of the selected potential model input and output variables. The block 114 then runs, for example, a PLS routine to calculate a correlation or regression coefficient b which identifies the correlation between an output score matrix U and an input score matrix T developed from the values of the selected potential model input and output variables.

For the purpose of discussion, the following variables will be used to describe a preferred PLS analysis implemented on a set of records developed from batch files for a batch process:

norec=the number of records;

invar=the number of selected potential model input variables;

outvar=the number of selected potential model output variables;

X=an input matrix dimensioned norec by invar containing the values of each of the selected potential model input variables for the developed records;

$X_{i,j}$=the data value of the jth potential model input variable within the ith record;

Y=an output matrix dimensioned norec by outvar containing the values of each of the selected potential model output variables for the developed records;

$Y_{i,j}$=the data value of the jth potential model output variable within the ith record;

T=an input score matrix dimensioned norec;

$t_i$=the ith input score;

U=an output score matrix dimensioned norec; and $u_i$=the ith output score.

To implement the preferred PLS analysis, the block 114 first configures a square identity matrix Z dimensioned the greater of invar by invar or outvar by outvar and configures a predicted output matrix E, dimensioned norec by outvar, as a null matrix. The block 114 then sets output scores $u_i$ (for i=1 to norec) equal to one row of the output matrix Y. In equation form the block 114 sets $$u_i = y_{i,c} \text{ \{for i=1 to norec\}} \quad (9)$$

wherein:

c=the chosen row of the output matrix Y.

Next, the block 114 regresses the columns of the input matrix X on the output score matrix U to calculate a prediction loading matrix W such that:

$$w_j = \sum_{i=1}^{norec} (x_{i,j} * u_i) \quad \{\text{for } j = 1 \text{ to } invar\} \quad (10)$$

wherein:

$w_j$=the jth value of the prediction loading matrix W.

The prediction loading variables $w_j$ are then normalized as:

$$w_j = \frac{w_j}{\left(\sum_{i=1}^{invar} w_i^2\right)^{1/2}} \quad \{\text{for } j = 1 \text{ to } invar\} \quad (11)$$

The input score matrix T is then calculated as:

$$t_i = \sum_{j=1}^{invar} (x_{i,j} * w_j) \quad \{\text{for } i = 1 \text{ to } norec\} \quad (12)$$

Next, columns of the output matrix Y are regressed on the input scores $t_i$ to develop an output loading vector q as:

$$q_k = \sum_{i=1}^{norec} (y_{i,k} * t_i) \quad \{\text{for } k = 1 \text{ to } outvar\} \quad (13)$$

Thereafter, the output loading vector q is normalized as:

$$q_k = \frac{q_k}{\left(\sum_{i=1}^{outvar} (q_i)^2\right)^{1/2}} \quad \{\text{for } i = 1 \text{ to } norec\} \quad (14)$$

A new set of output scores $u_i$ is then calculated as:

$$u_i = \sum_{k=1}^{outvar} (y_{i,k} * q_k) \quad \{\text{for } i = 1 \text{ to } norec\} \quad (15)$$

and a squared predicated error L is determined as:

$$L = \sum_{i=1}^{norec} (t_i - Told_i)^2 \quad (16)$$

wherein:

$Told_i$=the old value of $t_i$ (initially set to any large number, such as 10.0).

The block 114 next sets the variable $Told_i$ equal to the input score $t_i$ (for i=1 to norec) and determines if the squared predicated error L is less than a tolerance value. If not, the block 114 repeats the steps defined by equations (10) to (16) above until the squared predicated error L is reduced to be below the tolerance value or until a predetermined number of passes has been completed, for example, 200.

When the squared predicted error L is below the tolerance value or after the predetermined number of iterations has been completed, the block 114 calculates an input loading vector p as:

$$p_j = \sum_{i=1}^{norec} (x_{i,j} * t_i) \{\text{for } j = 1 \text{ to } invar\} \quad (17)$$

and then scales the input loading vector p as:

$$p_j = \frac{p_j}{tNorm} \quad \{\text{for } j = 1 \text{ to } invar\} \quad (18)$$

wherein:

$$tNorm = \sum_{i=1}^{norec} t_i^2 \quad (19)$$

Next, a normalizing value pNorm is calculated as:

$$pNorm = \sum_{j=1}^{invar} p_j^2 \quad (20)$$

and the p, t, and w variables are normalized as:

$$p_j = p_j/pNorm \quad \{\text{for } j=1 \text{ to } invar\} \quad (21)$$

$$t_i = t_i * pNorm \quad \{\text{for } i=1 \text{ to } norec\} \quad (22)$$

and $$w_j = w_j * pNorm \quad \{\text{for } j=1 \text{ to } invar\} \quad (23)$$

Thereafter, the regression coefficient b is calculated as:

$$b = \frac{\sum_{i=1}^{norec} (u_i * t_i)}{tNorm} \quad (24)$$

The block 114 then calculates the Z matrix according to the following equations:

$$v_k = \sum_{j=1}^{invar} (z_{k,j} * w_j) \quad \{\text{for } k = 1 \text{ to } outvar\} \quad (25)$$

and $$z_{k,j} = z_{k,j} - (v_k * p_j) \quad \{\text{for } j = 1 \text{ to } invar \text{ and } k = 1 \text{ to } outvar\} \quad (26)$$

wherein:

$Z_{k,j}$=the indexed value of the Z matrix.

The block 114 also determines a set of sensitivity coefficients between each pair of the selected potential model input and output variables as:

$$Coeff_{j,k,m} = Coeff_{j,k,m-1} + v_j * q_k * b \quad (27)$$
$$\{\text{for } j = 1 \text{ to } invar \text{ and } k = 1 \text{ to } outvar\}$$

wherein:

$Coeff_{j,k,m}$=The sensitivity coefficient between the ith input variable and the kth output variable at mth pass of the PLS analysis;

m=the PLS factor or the PLS iteration number.

and wherein:

$$Coeff_{j,k,0} = v_j * q_k * b \quad (28)$$
$$\{\text{for } j = 1 \text{ to } invar \text{ and } k = 1 \text{ to } outvar\}$$

Next, the block 114 calculates residual matrixes to replace the input matrix X and the output matrix Y according to the following equations:

$$x_{i,j} = z_{i,j} - t_i * p_j \quad (29)$$
$$\{\text{for } i = 1 \text{ to } norec \text{ and } j = 1 \text{ to } invar\}$$

$$y_{i,k} = y_{i,k} - t_i * q_k * b \quad (30)$$
$$\{\text{for } i = 1 \text{ to } norec \text{ and } k = 1 \text{ to } outvar\}$$

Thereafter, the block 114 calculates the predicted error matrix E as:

$$E_{i,k} = E_{i,k} + t_i * q_k * b \quad (31)$$
$$\{\text{for } i = 1 \text{ to } norec \text{ and } k = 1 \text{ to } outvar\}$$

wherein:

$E_{i,k}$=the indexed value of the E matrix;

to quantify the error between the predicted outputs and the actual outputs. The block 114 repeats the above-described procedures defined by the equations (9)–(31) for a number of times (m) equal to the number of PLS factors being used which, preferably, equals the number of input variables, to determine the overall PLS regression or correlation coefficient b and the sensitivity measurements $Coeff_{j,k,m}$ between the input and output variables.

The sensitivity measurements $Coeff_{j,k,m}$ identified above provide an estimate of how sensitive the jth input variable is in determining the kth output variable during the mth pass through the PLS analysis. Typically, all of the m sensitivity coefficients for an input/output variable pair (j/k) are viewed together, for example, the mean of these m values is computed, to determine how sensitive an input variable is in the determination of an output variable. A high value for a sensitivity coefficient indicates that the input/output variable pair associated therewith was important in the determination of the overall correlation coefficient b and, therefore, may be good input and/or output variables for use in the process model. A low sensitivity value, on the other hand, typically indicates that the variable pair associated therewith is not a good predictor and should not be used as a process model inputs and/or outputs. However, sensitivity measurements made according to the above PLS equations are highly dependent on the other variables within the PLS analysis and should not, therefore, be relied on as absolute determining factors when deciding whether a variable should be used as an input or an output to a process model. In other words, any particular variable pair usually has a different sensitivity coefficient when grouped with different sets of potential model input and output variables and thus, the fact that a particular pair of input and output variables may have a low PLS sensitivity coefficient when grouped with a first set of potential model input and output variables does not mean that the same pair of variables will not have a high PLS sensitivity coefficient when grouped with a different set of potential model input and output variables.

After the block 114 performs a PLS analysis on a selected set of potential model input and output variables, a block 116 determines whether the overall correlation coefficient b produced by the PLS analysis is sufficient by, for example, determining if this coefficient is above a predetermined threshold. If the overall correlation coefficient b is not sufficient according to any desired criteria, a block 118 refines the selected set of potential model input and/or output variables by choosing a new set of potential model input and/or output variables. This new set of potential model input and output variables may be an expanded set or a reduced set of a previous set of variables and/or may have one or more variables substituted for variables within a previous set. The decision as to which input and output variables should be kept, added to, or eliminated from the set of potential model input and output variables may be based on the PLS sensitivity measurements, the correlation measurements made by the block 110 and/or any other desired criteria. Of course, the block 118 may allow a user to select a new set of potential model input and output variables or select the criteria for choosing a new set of potential model variables. The block 118 may also store a list of previously selected and tested sets of variables along with the overall PLS correlation coefficient calculated for those sets of variables, and may refer to this list to avoid choosing a set of variables which has previously been tested.

After choosing a new set of potential model input and output variables, the block 118 returns control to the block 114 which runs a PLS analysis on the new set of potential model variables to determine a new overall PLS correlation coefficient and sensitivity measurements for that set of variables. Thereafter, the block 116 may compare the overall correlation coefficient to the threshold to determine if the new set of variables is adequate for use in creating the process model. The process of choosing a new set of potential model input and/or output variables, running a PLS analysis on the new set of potential model variables and determining if the overall correlation coefficient determined by the PLS analysis is sufficient is repeated until the PLS correlation coefficient meets or exceeds the predetermined threshold or any other desired criterion is met. Alternatively, when a certain number of sets of variables has been chosen and tested, i.e., after a certain number of iterations, the block 116 may simply retrieve from memory the set of variables which has the highest overall PLS correlation coefficient associated therewith and return that set as the set for use in creating the process model.

In any event, when the block 116 has determined a set of input and output variables which are appropriate for use in creating a process model, for example, one which has a PLS correlation coefficient which exceeds the predetermined threshold, that set of variables is supplied to a block 120 which creates training and/or test files having multiple records, each of which includes at least one data value from each of the batch sub-files for each of the chosen input and output variables. Alternatively, the block 120 may simply use the records developed by the block 114 for the chosen set of input and output variables to develop the training and/or test files.

After the training and/or test files have been created for the selected set of model input and output variables, these files are used by a block 122 to train and, if desired, test a neural network or other empirical or semi-empirical model for the process in any desired or known manner.

While the routine 100 of FIG. 5 has been described for use with the batch files of FIG. 4, this routine can also be used to automatically determine an appropriate set of input and output variables for continuous or semi-continuous processes using other types of files, such as the continuous files of FIG. 3. Continuous and batch files having configurations other than those illustrated in FIGS. 3 and 4 can also be used by the routine 100, it being understood that the principles involved in automatically determining an appropriate set of variables for a process model remain the same, irrespective of the actual format of the data files on which the method is used or implemented.

As noted above, the routine 100 can also implement any other desired regression analysis or iterative analysis instead of a PLS analysis to refine and test a set of potential model input and output variables.

Also, while the present invention has been described with reference to specific examples which are intended to be illustrative only and not to be limiting of the invention, it will be apparent to those of ordinary skill in the art that changes, additions and/or deletions may be made to the disclosed embodiments without departing from the spirit and scope of the invention.

I claim:

1. A computer program embodied on a computer readable medium for implementation on a computer that automatically develops a set of actual model input variables using values for a multiplicity of process input variables and at least one process output variable, comprising the steps of:
   determining a correlation measurement between each of the multiplicity of process input variables and the at least one process output variable;

automatically selecting a set of potential model input variables from the multiplicity of process input variables based on the correlation measurements;

performing a regression analysis on the set of potential model input variables to produce a regression analysis result for the set of potential model input variables; and choosing the set of potential model input variables as the set of actual model input variables based on the regression analysis result;

wherein the selected set of potential model input variables includes less than all of the multiplicity of process input variables.

2. The computer program according to claim 1, further performing the steps of picking a new set of potential model input variables and providing the new set of potential model input variables for use in the step of performing as the set of potential model input variables.

3. The computer program according to claim 2, wherein the step of performing calculates a sensitivity measurement related to the correlation between each of the set of potential model input variables and the at least one process output variable and wherein the step of picking includes a step of selecting the new set of potential model input variables based on the sensitivity measurement.

4. The computer program according to claim 2, wherein the step of picking includes a step of selecting the new set of potential model input variables from the multiplicity of process input variables using the correlation measurements.

5. The computer program according to claim 4, wherein the step of choosing includes a step of comparing the regression analysis result for the set of potential model input variables to a predetermined threshold.

6. The computer program according to claim 1, wherein the step of determining includes a step of calculating a linear correlation coefficient between one of the process input variables and the process output variable.

7. The computer program according to claim 6, wherein the step of calculating calculates the linear correlation coefficient between an input variable A and an output variable O from records of data pertaining to the input and output variables according to the equation:

$$CC_{A,O} = \frac{\sum_{i=1}^{n} A_i O_i - \frac{\sum_{i=1}^{n} A_i \sum_{i=1}^{n} O_i}{n}}{(Avar\, Ovar)^{1/2}}$$

wherein:

$CC_{A,O}$=the correlation coefficient between the input variable A and the output variable O;

n=the number of records for which the values of the variables A and O are determined;

$A_i$=the ith value of the input variable A;

$O_i$=the ith value of the output variable O;

Avar=the variance of the input variable A over the n records; and

Ovar=the variance of the output variable O over the n records.

8. The computer program according to claim 1, wherein the step of determining includes a step of calculating a non-linear correlation coefficient between one of the process input variables and the at least one process output variable.

9. The computer program according to claim 1, wherein the step of determining includes a step of time aligning data from a plurality of runs of a batch process.

10. The computer program according to claim 9, wherein the step of determining includes a step of scaling data from a plurality of runs of a batch process to have zero mean and unit variance.

11. The computer program according to claim 1, wherein the step of selecting selects the set of potential model input variables as a predetermined number of the process input variables having the highest correlation measurements associated therewith.

12. The computer program according to claim 1, wherein the step of selecting selects the set of potential model input variables as all of the process input variables having an associated correlation measurement greater than a predetermined threshold.

13. The computer program according to claim 1, wherein the step of performing includes a step of implementing a partial least squares analysis on the set of potential model input variables.

14. The computer program according to claim 1, further performing a step of producing a process model using the set of actual model input variables.

15. A process modeling system that automatically develops a set of actual model input variables using values for a multiplicity of process input variables and at least one process output variable, comprising:

a data processor including;

a memory for storing the values for the multiplicity of process input variables and at least one process output variable;

means for determining a correlation measurement between each of the multiplicity of process input variables and the at least one process output variable;

means for selecting a set of potential model input variables from the multiplicity of process input variables; and means for developing the set of actual model input variables from the selected set of potential model input variables including;

means for performing a regression analysis on the set of potential model input variables to produce a regression analysis result for the set of potential model input variables;

means for automatically creating a new set of potential model input variables;

means for providing the new set of potential model input variables to the performing means as the set of potential model input variables; and means for choosing one of the sets of potential model input variables developed by the selecting means or the creating means as the set of actual model input variables based on a selection criterion related to the regression analysis result;

wherein one of the selecting means and the creating means develops one of the sets of potential model input variables based on the correlation measurements and wherein at least one of the sets of potential model input variables includes less than all of the multiplicity of process input variables.

16. The process modeling system according to claim 15, wherein the selecting means selects the set of potential model input variables from the multiplicity of process input variables based on the correlation measurements.

17. The process modeling system according to claim 15, wherein the determining means includes means for calculating a non-linear correlation coefficient between one of the process input variables and the process output variable.

18. The process modeling system according to claim 15, wherein the performing means includes means for implementing a partial least squares analysis on the set of potential model input variables.

19. The process modeling system according to claim 18, wherein the partial least squares implementing means includes means for generating a set of sensitivity measurements related to the correlation between the set of potential model input variables and the at least one process output variable and the creating means creates the new set of potential model input variables based on the sensitivity measurements.

20. The process modeling system according to claim 15, further including means for generating a process model from the set of actual model input variables.

21. A method for implementation by a computer program embodied on a computer readable medium used with a computer for developing a process model from values for each of a multiplicity of process input variables and at least one process output variable, comprising the steps of:

storing the values for each of the multiplicity of process input variables and the at least one process output variable on a computer readable memory;

determining a correlation measurement between each of the multiplicity of process input variables and the process output variable from the stored values;

automatically selecting a set of potential model input variables from the multiplicity of process input variables based on the correlation measurements;

performing a regression analysis on the set of potential model input variables to produce a regression analysis result for the set of potential model input variables;

choosing the set of potential model input variables as a set of actual model input variables based on the regression analysis result; and using the values associated with the chosen set of actual model input variables to produce the process model;

wherein the selected set of potential model input variables includes less than all of the multiplicity of process input variables.

22. The method of developing a process model according to claim 21, further including the steps of selecting a succession of different sets of potential model input variables and performing a regression analysis on each of the succession of different sets of potential model input variables to develop a regression analysis result associated with each of the succession of different sets of potential model input variables and wherein the step of choosing includes the step of choosing one of the succession of sets of potential model input variables as the set of actual model input variables based on the regression analysis results.

23. The method of developing a process model according to claim 22, wherein the step of selecting the succession of sets of potential model input variables selects a new set of potential model input variables based on the correlation measurements.

24. The method of developing a process model according to claim 21, wherein the step of determining includes the step of calculating a non-linear correlation coefficient between one of the process input variables and the process output variable.

25. The method of developing a process model according to claim 21, wherein the step of performing a regression analysis includes the step of implementing a partial least squares analysis.

26. The computer program of claim 1, wherein the process input variables comprise batch process input variables and wherein the step of selecting selects a variable type and a time associated with each of the potential model input variables.

27. The process modeling system of claim 15, wherein the process input variables comprise batch process input variables and wherein the creating means selects a variable type and a time associated with each of the new set of potential model input variables.

* * * * *

UNITED STATES PATENT AND TRADEMARK OFFICE
CERTIFICATE OF CORRECTION

PATENT NO. : 5,727,128

DATED : March 10, 1998

INVENTOR(S) : Morrison, S.

Page 1 of 2

It is certified that error appears in the above-identified patent and that said Letters Patent is hereby corrected as shown below:

On page 2 of the title page under Other Publications, "Kasper" should be "Kaspar";

On page 2 of the title page under Other Publications, "Qin et al., 'Combining Statitics" should be Qin et al., 'Combining Statistics";

Column 10, line 14, the " = " should be omitted;

Column 10, line 45

$$CC_{A_j,O_k} = \sum_{i=1}^{n} A_{i,j} O_{i,k} - \frac{\sum_{i=1}^{n} A_{i,j} \sum_{i=1}^{n} O_{i,k}}{n}$$

should be:

$$CC_{A_j,O_k} = \frac{\sum_{i=1}^{n} A_{i,j} O_{i,k} - \frac{\sum_{i=1}^{n} A_{i,j} \sum_{i=1}^{n} O_{i,k}}{n}}{(Avar_j \; Ovar_k)^{1/2}}$$

Column 14, line 56

$$x_{i,j} = z_{i,j} - t_i * p_j$$

UNITED STATES PATENT AND TRADEMARK OFFICE
CERTIFICATE OF CORRECTION

PATENT NO. : 5,727,128
DATED : March 10, 1998
INVENTOR(S) : Morrison, S.

It is certified that error appears in the above-identified patent and that said Letters Patent is hereby corrected as shown below:

should be:

$$x_{i,j} = x_{i,j} - t_i * p_j$$

Signed and Sealed this

Twenty-first Day of March, 2000

*Attest:*

Q. TODD DICKINSON

*Attesting Officer*     *Commissioner of Patents and Trademarks*